July 7, 1970  A. P. MORREALE ET AL  3,519,859
HOLLOW ROTOR SYNCHRONOUS INDUCTOR-TYPE STEPPING MOTOR
WITH COIL AND P-M EXCITATION
Filed April 7, 1969

INVENTOR.
ANTHONY P. MORREALE
BY RAYMOND R. IRANI

Christie, Parker & Hale
ATTORNEYS

United States Patent Office 3,519,859
Patented July 7, 1970

3,519,859
HOLLOW ROTOR SYNCHRONOUS INDUCTOR-TYPE STEPPING MOTOR WITH COIL AND P-M EXCITATION
Anthony P. Morreale, Whittier, and Raymond R. Irani, Los Angeles, Calif., assignors to Computer Devices Corporation, Santa Fe Springs, Calif., a corporation of California
Filed Apr. 7, 1969, Ser. No. 814,148
Int. Cl. H02k 1/06, 21/00, 37/00
U.S. Cl. 310—49                    6 Claims

ABSTRACT OF THE DISCLOSURE

A reversible synchronous inductor-type stepping motor having a low inertia hollow rotor in the form of a thin magnetic toothed sleeve supported for rotation by a low-mass nonmagnetic hub. The salient pole stator is provided with two coils per pole, and further excitation is provided by an axially magnetized fixed cylindrical permanent magnet with pole members having a lesser diameter than the hollow rotor.

BACKGROUND OF THE INVENTION

The invention relates to electrical stepping motors and, more particularly, to a motor of the synchronous inductor type utilizing a permanent magnet excitation.

Synchronous motors of the stepping type are well known in which the rotor is caused to advance in incremental steps controlled by the relative spacing of teeth on the rotor and on the poles of the stator. As these stator poles are successively magnetized by energizing associated windings, the rotor advances so as to bring the teeth on the rotor in registration with the teeth on successive stator pole faces. In many applications, it is highly desirable that the motor exhibit high torque in indexing from one angular position to the next and yet come to rest at the next angular position with a minimum of overshoot or oscillation. Because in most prior art designs, the permanent magnet for exciting the motor is incorporated as part of the rotating mass of the motor, the rotor has exhibited relatively high inertia, greatly increasing the tendency to overshoot or oscillate as it advances to successive angular stepping positions. Various techniques have been used to reduce the inertia of the motor, such as designing the motor to minimize the diameter, but this reduces the torque of the motor. It has also been proposed to immerse the motor in damping fluid to reduce the overshoot and oscillation during the stepping operation.

SUMMARY OF THE INVENTION

The present invention provides an improved stepping motor in which the rotor element is in the form of a thin, cylindrical sleeve which rotates in the annular space provided by a salient pole stator and the magnetic pole member of a permanent magnet. The sleeve of the rotor is supported in concentric relationship to the shaft of the motor by a light-weight nonmagnetic hub so as to provide a rotor construction of very low inertia. The permanent magnet is in the form of a cylinder concentrically surrounding the shaft and is mounted to form a magnetic circuit with the frame of the motor. A radial magnetic field is formed by the permanent magnet in the annular space between the stator and one pole member of the permanent magnet, the rotor sleeve rotating through this magnetic field.

BRIEF DESCRIPTION OF THE DRAWING

For a better understanding of the invention, reference should be made to the accompanying drawing, wherein.

DESCRIPTION OF THE PREFERRED EMBODIMENT

Figure 1:
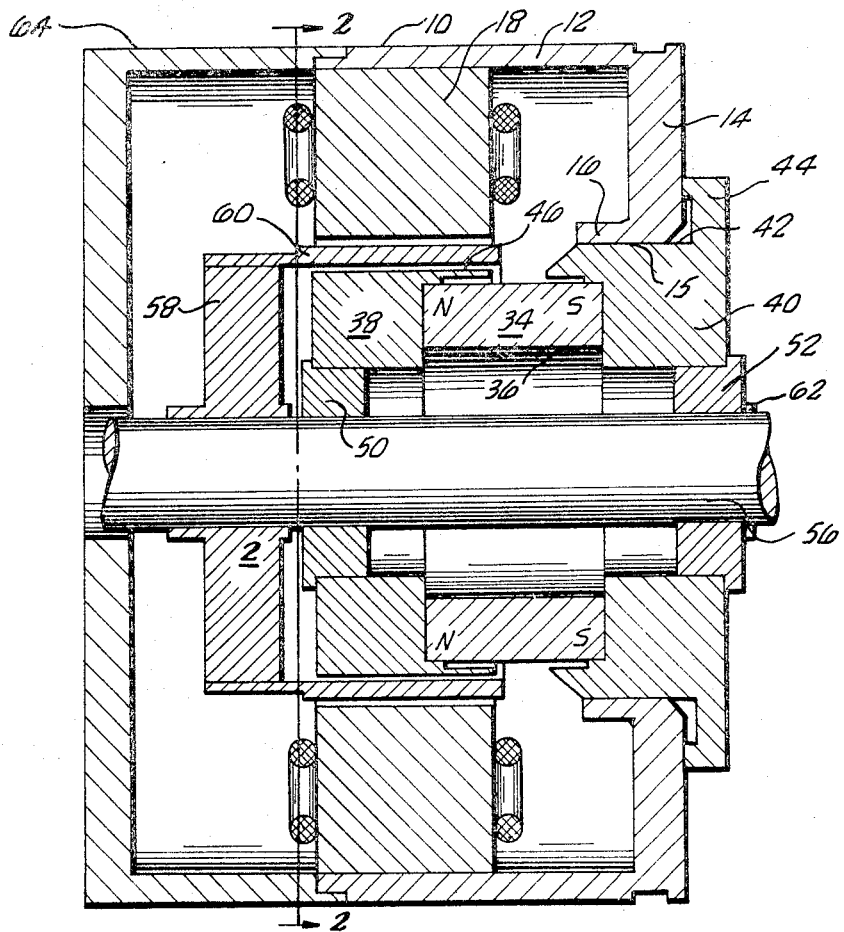
FIG. 1 is a sectional view of the motor.

Referring to the drawing in detail, the numeral 10 indicates generally the outer frame of the motor which is constructed of magnetic material and forms part of a protective housing. The frame includes an outer cylindrical sleeve portion 12 and an integral end portion 14. The end portion has a cylindrical opening 15 formed by an inner shoulder 16.

Figure 2:
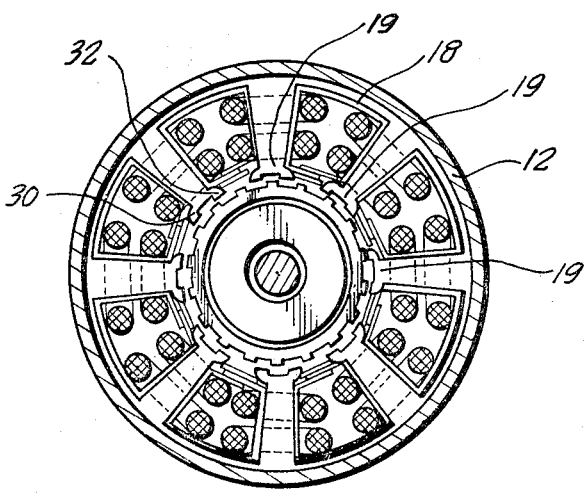
FIG. 2 is a cross-sectional view taken along the line 2—2 of FIG. 1.

Mounted within the sleeve portion 12 is a stator assembly 18. The stator assembly is made up of a stack of laminations in the manner of standard stator design. As best shown in FIG. 2, the stator laminations are shaped to form a number of salient poles, preferably eight in number, which project radially inwardly toward the center of the stator. Each pole is wound with two coils of wire with the coils on alternate poles being connected in series. Thus, there are four sets of series windings. Operation of the stepping motor is achieved by applying a voltage successively to each of the four sets of series windings so that successive poles of the stator are magnetized in sequence to the same polarity, i.e., a rotating field is produced. Each set of windings, when energized, polarizes alternate poles with opposite magnetic polarity. Thus four poles of the stator are magnetized at any given time in a pattern of north, south, north, and south around the stator.

The inner ends of the poles terminate in pole faces which form a substantially cylindrical opening through the center of the stator. Each of the poles is provided with a single notch which, in effect, forms two teeth on the pole face, such as indicated at 30 and 32. With eight poles as shown the poles are angularly displaced at intervals of 45°. The angular displacement between adjacent teeth on each of the pole faces may, for example, be 20°.

A fixed permanent magnet core is provided which includes a cylindrical magnet member 34 made of Alnico or similar permanently magnetized material. The magnet member has a concentric opening therethrough, indicated at 36. The permanent magnet member 34 is polarized in a direction parallel with the axis of revolution so that the ends of the magnet are polarized, respectively, as north and south poles. Joined at either end of the magnet 34 are first and second magnetic pole members 38 and 40. The pole member 40 is in the form of a magnetic bushing having an outer cylindrical surface 42 which fits into the opening 15 in the end portion 14 of the frame 10. The bushing is formed with a shoulder 44 which fixes the lateral position of the bushing relative to the frame.

The pole member 38 has an outer cylindrical surface 46 which is concentrically positioned within the opening in the stator formed by the pole faces, leaving an annular space between the pole member surface 46 and the pole faces of the stator 18. The magnet 34 and the pole members 38 and 40 are bonded together or otherwise suitably joined to form an integral assembly.

A central bore extends through the pole members 38 and 40 and suitable bearings 50 and 52 are pressed into the central bore in the respective pole members. A shaft 56 is journaled in the bearings 50 and 52. The shaft 56 supports a rotor assembly which includes a cylindrical hub 58 made of a light, monmagnetic material such as aluminum and a thin, cylindrical sleeve 60 made of magnetic material and secured adjacent one end of the sleeve to the hub 58. Thus, the hub supports the rotor sleeve 60 in concentric relation to the shaft 56. The thin magnetic sleeve is arranged to project in cantilever fashion into the annular space between the pole member 38 and the pole faces of the stator 18.

As shown in FIG. 2, the outer cylindrical surface of the magnetic sleeve 60 is notched to form a plurality of axially extending teeth on the outer periphery thereof. These notches or grooves are spaced so that the center distance between the adjacent teeth is the same as the distance between the teeth on the pole faces, namely, 20°. By this arrangement, it will be apparent that if the teeth on the rotor sleeve are directly aligned with the teeth on one of the pole faces, the teeth will also be aligned with the teeth on the stator pole at the diametrically opposite position of the stator. However, the teeth will be offset by 5° and 10°, respectively, at the intermediate pole positions.

It will be seen that the permanent magnet tends to polarize all of the stator poles in the same polarity, thereby locking up the rotor in the position in which the teeth are aligned with one set of opposite poles. If now the series of coils on the stator poles on which the teeth are misaligned by 5° is energized, there will be an attraction force between the displaced teeth tending to align them on one set of poles and a repelling force produced by the permanent magnet on the quadrature poles. Thus, a torque is produced in one direction which advances the rotor 5° so as to bring the teeth into alignment in the next adjacent pole position. By successively energizing the four sets of windings, the rotor advances in increments of 5° at a time.

From the above description, it will be seen that a simplified construction for a stepping motor is provided in which the inertia of the motor can be made extremely low, since most of the rotating mass is in the very thin magnetic sleeve. The permanent magnet and pole members for the permanent magnet are stationary and therefore do not affect the moment of inertia of the rotating mass. By rotating the magnetic sleeve through the permanent magnetic field formed in the annular gap between the stator and the pole member of the magnet, a damping effect is produced on the rotor by the generation of eddy currents within the sleeve. This reduces the tendency of the rotor to overshoot and oscillate about any indexing position.

In addition, the described constructional arrangement greatly simplifies the manufacture and assembly of the motor. After the stator assembly is mounted in the frame 10, the opening 15 and the opening through the stator stack are through-bored as a unit so that they are identical in diameter. This stator and frame assembly is then joined to the permanent magnet assembly by means of a precision spacer which is positioned in the annular space between the stator 18 and the pole member 38, assuring accurate alignment between these two assemblies. The pole member 40 of the magnet assembly is then rigidly secured to the frame by filling the spaces formed by the shoulder 44 with epoxy or other suitable bonding cement to form a unitary structure.

The rotor is similarly assembled by providing an accurate spacer which slips on the shaft 56 and on which the sleeve 60 is placed, thereby holding the sleeve and shaft in accurate concentric relationship. The hub 58 is then slipped into position and the spaces between the hub and shaft and the hub and the sleeve 60 are filled with cement and the assembly securely bonded, after which, the spacer is removed. The shaft 56 is then inserted into the bearings 50 and 52 to complete the assembly. A retaining ring 62 adjacent the bearing 52 secures the shaft in position. A suitable cover 64 may then be slipped over the end of the shaft and joined to the frame 10 to complete the motor assembly.

What is claimed is:

1. A stepping motor comprising a stator assembly having salient poles and windings on the poles, the pole faces forming a circular opening through the stator and having circumferentially spaced grooves forming teeth projecting inwardly toward the center of the opening, a stationary core assembly including a permanent magnet, a first pole member secured to one end of the magnet, the first pole member having an outer cylindrical surface slightly smaller than the opening in the stator, a second pole member secured to the other end of the magnet, a magnetic frame member engaging the second pole member and having an outer portion engaging the stator and positioning the stator in aligned concentric position relative to the first pole member to form an annular space between the outer cylindrical surface of the pole member and the pole faces of the stator, a cylindrical magnetic rotor sleeve, the sleeve having grooves around the outer surface thereof forming teeth, and means rotatably supporting the sleeve from one end thereof with the sleeve extending into the annular space between the stator and the first pole member.

2. Apparatus as defined in claim 1 wherein the permanent magnet and two pole members have aligned openings therethrough, said rotatable supporting means including a shaft extending through said openings, bearing members mounted in the openings in said pole members, the shaft being journaled in said bearing members.

3. Apparatus as defined in claim 2 wherein said rotatable supporting means further includes a hub of nonmagnetic material secured to said shaft adjacent said first pole member, the rotor sleeve being secured to said hub.

4. Apparatus as defined in claim 1 wherein the frame member has an opening axially aligned with and the same diameter as the circular opening in the stator, the second pole member having an outer cylindrical surface engaging said opening in the frame member for holding the core assembly in axially aligned position relative to the stator.

5. A stepping motor comprising a stator assembly having a plurality of poles defining a cylindrical opening, a fixed magnetic pole member having an outer cylindrical surface, means including a permanent magnet for supporting said pole member in fixed rigid relationship to the stator assembly with the pole member being concentrically and coaxially positioned in the cylindrical opening, the pole member being of smaller diameter than the opening in the stator whereby the pole member and stator define an annular space, the permanent magnet polarizing the pole member and stator to provide radial flux lines extending across the annular space, a cylindrical sleeve of magnetic material, means rotatably supporting the sleeve from one end with the sleeve projecting into said annular space, the sleeve having a plurality of teeth on the outer periphery thereof extending parallel to the axis of rotation, and the poles of the stator member having teeth projecting inwardly toward the teeth on said sleeve.

6. Apparatus of claim 5 wherein the permanent magnet is annular in shape to provide an opening and secured at one end to the pole member, the pole member having an opening therethrough aligned with the opening in the permanent magnet, a shaft extending through the pole member and magnet rotatably supported in said openings, and nonmagnetic means mounting said sleeve concentrically on the shaft for rotation with the shaft.

References Cited

UNITED STATES PATENTS

| | | | |
|---|---|---|---|
| 2,851,620 | 9/1958 | Hausen | 310—49 |
| 3,286,109 | 11/1966 | Madsen | 310—49 |
| 3,416,015 | 12/1968 | Ordas | 310—49 |
| 3,428,837 | 2/1969 | Morreale et al. | 310—49 |

WARREN E. RAY, Primary Examiner

U.S. Cl. X.R.

310—152, 181, 266